US010268519B2

(12) United States Patent
Chen et al.

(10) Patent No.: US 10,268,519 B2
(45) Date of Patent: Apr. 23, 2019

(54) SCHEDULING METHOD AND PROCESSING DEVICE FOR THREAD GROUPS EXECUTION IN A COMPUTING SYSTEM

(71) Applicant: INDUSTRIAL TECHNOLOGY RESEARCH INSTITUTE, Hsinchu (TW)

(72) Inventors: Heng-Yi Chen, Chiayi County (TW); Chung-Ho Chen, Tainan (TW); Chen-Chieh Wang, Yilan County (TW); Juin-Ming Lu, Hsinchu (TW); Chun-Hung Lai, Taichung (TW); Hsun-Lun Huang, Taichung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 232 days.

(21) Appl. No.: 14/983,086

(22) Filed: Dec. 29, 2015

(65) Prior Publication Data

US 2017/0139751 A1 May 18, 2017

(30) Foreign Application Priority Data

Nov. 16, 2015 (TW) .............................. 104137764 A

(51) Int. Cl.
G06F 9/46 (2006.01)
G06F 9/50 (2006.01)
(52) U.S. Cl.
CPC .......... *G06F 9/5038* (2013.01); *G06F 9/5016* (2013.01)
(58) Field of Classification Search
None
See application file for complete search history.

(56) References Cited

U.S. PATENT DOCUMENTS 7,818,747 B1 10/2010 Fedorova et al.
8,108,862 B2 1/2012 Di Gregorio et al.
8,135,941 B2 3/2012 Luick
(Continued)

FOREIGN PATENT DOCUMENTS

CN 101681262 A 3/2010
CN 102360310 A 2/2012
(Continued)

OTHER PUBLICATIONS

Taiwanese Office Action dated Jun. 22, 2016.
Adwait Jog et al., "OWL: Cooperative Thread Array Aware Scheduling Techniques for Improving GPGPU Performance", ACM SIGARCH Computer Architecture News—ASPLOS '13, vol. 41, Issue 1, Mar. 16-20, 2013.
(Continued)

*Primary Examiner* — Wissam Rashid
(74) *Attorney, Agent, or Firm* — Rabin & Berdo, P.C.

(57) ABSTRACT

A scheduling method is provided. The method includes: recording a next instruction and a ready state of each thread group in a scoreboard; determining whether there is any ready thread group whose ready state is affirmative; determining whether a load/store unit is available, wherein the load/store unit is configured to access a data memory unit; when the load/store unit is available, determining whether the ready thread groups include a data access thread group, wherein the next instruction of the data access thread group is related to accessing the data memory unit; selecting a target thread group from the data access thread groups; and dispatching the target thread group to the load/store unit for execution.

20 Claims, 5 Drawing Sheets

(56) References Cited

U.S. PATENT DOCUMENTS

| | | | |
|---|---|---|---|
| 8,291,431 B2 | 10/2012 | Du et al. | |
| 8,423,750 B2 | 4/2013 | Hall et al. | |
| 8,490,101 B1 | 7/2013 | Small et al. | |
| 8,522,244 B2 | 8/2013 | Chung et al. | |
| 8,732,711 B2 | 5/2014 | Dally et al. | |
| 8,732,713 B2* | 5/2014 | Coon | G06F 9/4881 |
| | | | 718/102 |
| 8,819,686 B2 | 8/2014 | Memik et al. | |
| 8,850,131 B2 | 9/2014 | Chung | |
| 2011/0072244 A1 | 3/2011 | Lindholm et al. | |
| 2011/0276784 A1* | 11/2011 | Gewirtz | G06F 9/3802 |
| | | | 712/205 |
| 2012/0079241 A1 | 3/2012 | Dally et al. | |
| 2015/0128144 A1* | 5/2015 | Mansell | G06F 9/50 |
| | | | 718/104 |

FOREIGN PATENT DOCUMENTS

| | | | |
|---|---|---|---|
| TW | 200529071 A | 9/2005 | |
| TW | 201333819 A1 | 8/2013 | |
| TW | I462011 B | 11/2014 | |

OTHER PUBLICATIONS

Adwait Jog et al., "Orchestrated Scheduling and Prefetching for GPGPUs", ACM SIGARCH Computer Architecture News—ICSA '13, vol. 41, issue 3, Jun. 2013.

Onur Kayiran et al., "Managing GPU Concurrency in Heterogeneous Architectures", MICRO-47 Proceedings of the 47th Annual IEEE/ACM International Symposium on Microarchitecture, pp. 114-126, 2014.

Veynu Narasiman et al., "Improving GPU Performance via Large Warps and Two-Level Warp Scheduling", MICRO-44 Proceedings of the 44th annual IEEE/ACM International Symposium on Microarchitecture, pp. 308-317, Dec. 3-7, 2011.

Timothy G. Rogers et al., "Cache-Conscious Wavefront Scheduling", MICRO-45 Proceedings of the 2012 45th Annual IEEE/ACM International Symposium on Microarchitecture, pp. 72-83, 2012.

Shin-Ying Lee et al., "CAWS: Criticality-Aware Warp Scheduling for GPGPU Workloads", PACT '14 Proceedings of the 23rd International Conference on Parallel Architectures and Compilation, pp. 175-186, Aug. 24-27, 2014.

Heng-Yi Chen et al., "An HSAIL ISA Conformed GPU Platform", Department of Electrical Engineering and Institute of Computer and Communication Engineering, National Cheng Kung University.

* cited by examiner

| ID | Valid | PC | INS | Ready | Flags | | | |
|---|---|---|---|---|---|---|---|---|
| 0 | Y | $PC_0$ | LD | Y | | | ... | |
| 1 | Y | $PC_1$ | ADD | Y | | | ... | |
| 2 | Y | $PC_2$ | SUB | N | | | ... | |
| 3 | Y | $PC_3$ | MUL | Y | | | ... | |
| 4 | N | $PC_4$ | | | | | ... | |
| 5 | Y | $PC_5$ | ST | Y | | | ... | |
| ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ |
| M | Y | $PC_M$ | ST | N | | | ... | |

SCHEDULING METHOD AND PROCESSING DEVICE FOR THREAD GROUPS EXECUTION IN A COMPUTING SYSTEM

This application claims the benefit of Taiwan application Ser. No. 104137764, filed Nov. 16, 2015, the subject matter of which is incorporated herein by reference.

TECHNICAL FIELD

The disclosure relates to a scheduling method for multiple thread groups and a processing device using the same.

BACKGROUND

In a generic computer system, a central processing unit (CPU) is deployed to perform general computation tasks. In order to solve various particular problems, especially for those computation intensive and requiring parallel computing, other computation units have been added to the computer system. Among these computation units the most common one is a graphics processing unit (GPU).

As the performance of the GPU grows rapidly, general-purpose computing on GPUs (GPGPU) that utilizes GPU for massively parallel computing applications has become a trend for the next generation high performance computing. The GPU achieves parallel computing to enhance computation performance by scheduling multiple thread groups and dispatching the thread groups to multiple processing elements to be executed simultaneously. Thus there is a need for an efficient scheduling method.

SUMMARY

The disclosure relates to a scheduling method for multiple thread groups and a processing device using the same.

According to one embodiment, a scheduling method for scheduling thread groups is provided. The method includes: recording a next instruction and a ready state of each thread group in a scoreboard; determining whether or not there is at least one ready thread group, wherein the ready state of the at least one ready group is affirmative; determining whether or not a load/store unit is available, wherein the load/store unit is configured to access a data memory unit; determining whether or not at least one data access thread group exists in the at least one ready thread group when the load/store unit is available, wherein the next instruction of the at least one data access thread group is related to accessing the data memory unit; selecting a target thread group from the at least one data access thread group when the at least one data access thread group exists; and dispatching the target thread group to the load/store unit for execution.

According to another embodiment, a processing device for scheduling thread groups is provided. The processing device includes a warp control unit, an instruction fetch unit, a functional unit, a memory access first (MAF) unit, a warp scheduler, and a dispatch unit. The warp control unit is configured to maintain a scoreboard, the scoreboard recording an execution state of each thread group, including a next instruction and a ready state of each thread group. The instruction fetch unit is configured to fetch the next instruction of each thread group from an instruction memory unit and update to the scoreboard. The functional unit includes an arithmetic unit and a load/store unit. The load/store unit is configured to access a data memory unit. The MAF unit is configured to monitor whether or not the load/store unit is available, and determine whether or not at least one data access thread group exists when the load/store unit is available, wherein the ready state of the at least one data access thread group is affirmative, and the next instruction of the at least one data access thread group is related to accessing the data memory unit. The warp scheduler is configured to select a target thread group from the thread groups according to the execution state of each thread group in the scoreboard. The dispatch unit is configured to dispatch the target thread group to the load/store unit or the arithmetic unit for execution. When the load/store unit is available and the at least one data access thread group exists, the warp scheduler selects the target thread group from the at least one data access thread group.

According to still another embodiment, a non-transitory computer readable medium with instructions stored thereon for scheduling thread groups is provided. The instructions that when executed on a computer processor perform the steps including: recording a next instruction and a ready state of each thread group in a scoreboard; determining whether or not there is at least one ready thread group, wherein the ready state of the at least one ready group is affirmative; determining whether or not a load/store unit is available, wherein the load/store unit is configured to access a data memory unit; determining whether or not at least one data access thread group exists in the at least one ready thread group when the load/store unit is available, wherein the next instruction of the at least one data access thread group is related to accessing the data memory unit; selecting a target thread group from the at least one data access thread group when the at least one data access thread group exists; and dispatching the target thread group to the load/store unit for execution.

Figure 1:
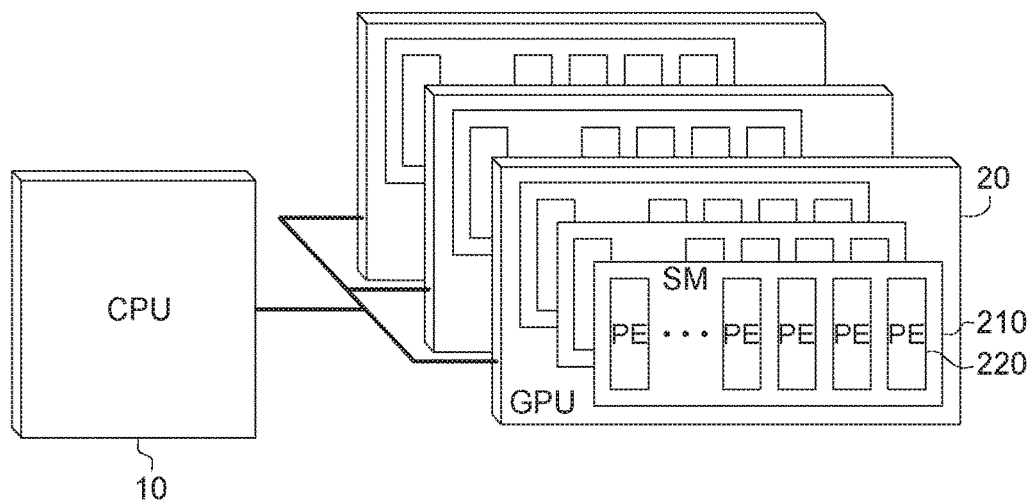
FIG. 1 shows a diagram illustrating exemplary heterogeneous system architecture.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows a diagram illustrating exemplary heterogeneous system architecture (HSA). As the HSA shown in FIG. 1, the CPU 10 may cooperate with multiple GPUs 20. The GPU 20 may be used as a GPGPU. For example, the GPU 20 may not only perform graphic operation but also process general purpose data computation, especially for applications of single instruction multiple data (SIMD), such as weather simulation, molecular model, calculations in physics and chemistry research fields.

As shown in FIG. 1, the HSA may include multiple GPUs 20, which is the first hierarchy of parallel computing. The GPU 20 may include multiple streaming multiprocessors (SM) 210, which is the second hierarchy of parallel computing. Each SM 210 may include multiple processing elements (PE) 220, which is the third hierarchy of parallel computing. By exploiting the highly parallel structure within the GPU 20, efficient computation can be achieved for SIMD applications. The program structure corresponding to the GPU 20 may be referred to in FIG. 2.

Figure 2:
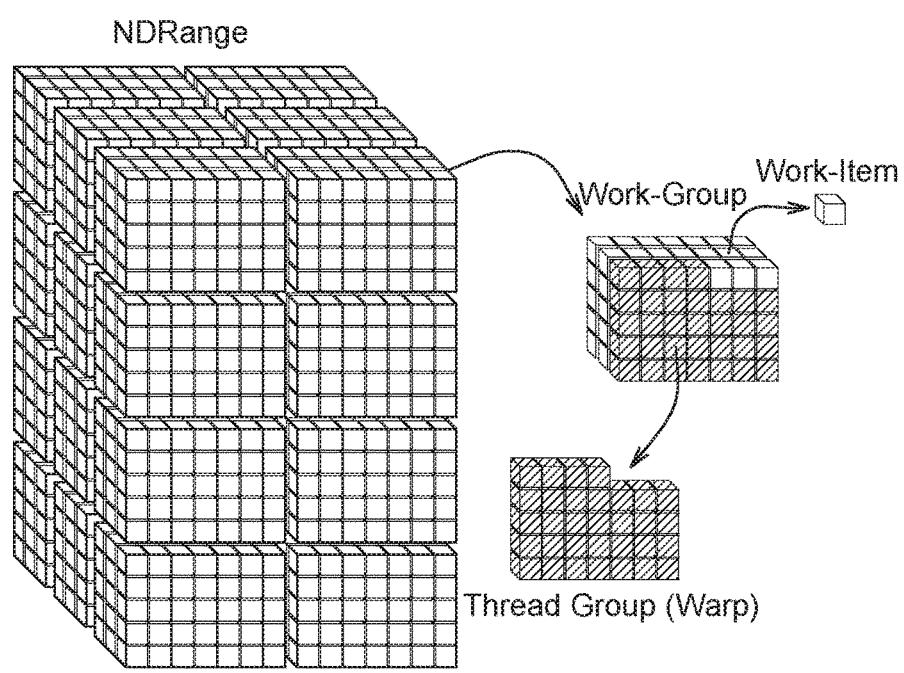
FIG. 2 shows a diagram illustrating work-groups and thread groups.

FIG. 2 shows a diagram illustrating work-groups and thread groups. Open Computing Language (OpenCL) is a framework for writing programs that execute on the HSA. Take the OpenCL architecture for example, a program processed by the GPU 20 may be regarded as an N-dimensional range (NDRange, also be called Grid). The example shown in FIG. 2 is a 3-dimensional range. The NDRange may be divided into multiple work-groups. Each work-group is assigned to a SM 210. The NDRange may be divided into work-groups with appropriate size according to the hardware specification of the GPU 20. Each work-group includes multiple work-items. Each work-item is corresponding to a thread, which is assigned to a PE 220 for execution. Because one SM 210 includes multiple PEs 220, several work-items may be grouped together to form a thread group according to the number of PEs 220. A thread group may also be referred as a warp or a wavefront. These three terms will be used interchangeably in the following description.

The SM 210 receives a work-group, which may be divided into multiple thread groups. The size of the thread group is related to the hardware specification of the SM 210, for example, the number of PEs 220 inside the SM 210. If there are more PEs 220, the number of threads that can be executed simultaneously becomes larger, and hence the size of the thread group is larger. The SM 210 arranges the execution time and execution order for each thread group, that is, the SM 210 schedules multiple thread groups. For example, in a clock cycle of the SM 210, one thread group is assigned to multiple PEs 220. Each PE 220 corresponds to a thread respectively. Each PE 220 executes the same instruction within the thread to achieve parallel computing. In one embodiment, one SM 210 includes sixteen PEs 220s. The sixteen PEs 220 execute the ADD instruction simultaneously while each PE 220 corresponds to different data. The scheduling method and the processing device using the same according to embodiments of this disclosure are given below.

Figure 3:
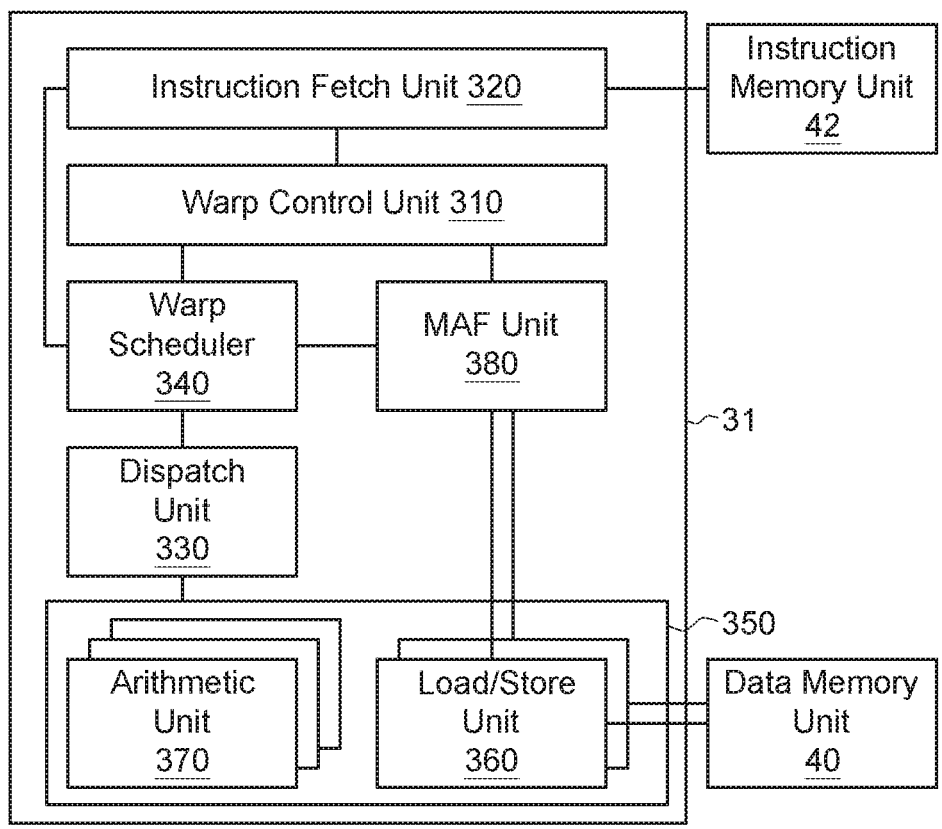
FIG. 3 shows a diagram illustrating a processing device according to an embodiment of this disclosure.

FIG. 3 shows a diagram illustrating a processing device 31 according to an embodiment of this disclosure. The processing device 31 may be a streaming multiprocessor 210 as described above, a scheduling unit in a CPU, or a module that performs thread group scheduling in a GPU. The processing device 31 may schedule multiple thread groups $W_0, W_1, W_2, \ldots, W_M$. The processing device 31 includes a warp control unit 310, an instruction fetch unit 320, a dispatch unit 330, a warp scheduler 340, a memory access first (MAF) unit 380, and a functional unit 350. The functional unit 350 includes one or more load/store units 360 and one or more arithmetic units 370. Two load/store units 360 and three arithmetic units 370 are shown in FIG. 3. In this embodiment, the number of the load/store units 360 is different from the number of the arithmetic units 370. In another embodiment, the number of the load/store units 360 may also be the same as the number of the arithmetic units 370. The warp control unit 310 is configured to maintain a scoreboard T, which records the execution state of each thread group $W_i$, such as the next instruction $INS_i$ to be executed and the ready state $RD_i$ of each thread group $W_i$. The instruction fetch unit 320 is configured to fetch the next instruction $INS_i$ of each thread group $W_i$ from an instruction memory unit 42 and update to the scoreboard T. The load/store unit 360 is configured to access a data memory unit 40. The MAF unit 380 is configured to monitor whether or not the load/store unit 360 is available, and determine whether or not at least one data access thread group $W_{DA}$ exists when the load/store unit 360 is available, wherein the ready state $RD_i$ of the at least one data access thread group $W_{DA}$ is affirmative, and the next instruction $INS_i$ of the at least one data access thread group $W_{DA}$ is related to accessing the data memory unit 40. The warp scheduler 340 is configured to select a target thread group $W_T$ from the thread groups $W_0$-$W_M$ according to the execution state of each thread group $W_i$ in the scoreboard T. The dispatch unit 330 is configured to dispatch the target thread group $W_T$ to its target functional unit 350, such as the load/store unit 360 or the arithmetic unit 370, for execution. When the load/store unit 360 is available and the at least one data access thread group $W_{DA}$ exists, the warp scheduler 340 selects the target thread group $W_T$ from the at least one data access thread group $W_{DA}$. Detailed description of each unit is given below.

Take FIG. 1 and FIG. 2 for example, the processing device 31 may be the SM 210. The processing device 31 may be assigned a work-group, which is divided into multiple thread groups $W_0, W_1, W_2, \ldots, W_M$. Each thread group $W_i$ includes multiple threads. For example, for the SM 210 that includes sixteen PEs 220, one thread group may include sixteen threads, each of which may be executed independently. Each thread includes multiple instructions, which can be executed by the PE 220. Examples of the instructions include arithmetic instructions such as ADD (addition), SUB (subtraction), MUL (multiplication), DIV (division) and memory access instructions such as LD (load data) and ST (store data).

The warp control unit 310 is configured to maintain the scoreboard T, which records the execution state of each thread group $W_i$, such as the next instruction $INS_i$ to be executed and the ready state $RD_i$ of each thread group $W_i$. Because the execution state of each thread group is stored in the scoreboard maintained by the warp control unit 310, the warp control unit 310 may also be called a state storage unit. One thread group includes multiple threads that are executed in parallel, and one thread includes multiple instructions that are executed sequentially. Information regarding which instruction is currently being executed in each thread group can be obtained and what the next instruction is can be recorded. Such information may be obtained from the instruction fetch unit 320. For example, a thread in the thread group $W_i$ includes sequentially executed instructions {LD-ADD-SUB-ST}. Such instruction order may be stored at a specific address of the instruction memory unit 42 (such as memory). After executing the ADD instruction (or the execution is about to finish), the program counter (PC) may obtain the next memory address. The instruction fetch unit 320 then fetches the next instruction at the next memory address of the instruction memory unit 42.

A fetched instruction has to be decoded for execution. For ease of illustration, the instruction fetch unit 320 shown in FIG. 3 may also be capable of decoding instructions. In implementation, the instruction fetch and the instruction decode may each correspond to one pipeline stage of the instruction pipeline. The instruction fetch unit 320 fetches the next instruction from the instruction memory unit 42 and may also update the next instruction $INS_i$ of the thread group $W_i$ stored in the scoreboard T. The ready state $RD_i$ in the scoreboard may be related to whether or not the next instruction $INS_i$ has been decoded and whether or not operands corresponding to the next instruction $INS_i$ have been available. For example, if the next instruction ADD is to add two values in the registers R1 and R2, when the next instruction ADD has been decoded, and when the values in the registers R1 and R2 are available, the next instruction ADD is ready, the corresponding ready state may be set as affirmative. The scoreboard T, which is maintained by the warp control unit 310, may be implemented by hardware circuits, such as random access memory (RAM), latches, flip-flops, or other circuits capable of storing state information.

The arithmetic unit 370 and the load/store unit 360 may have multiple processing elements to execute multiple threads of a thread group simultaneously to achieve parallel computing. The functional unit 350 may include multiple arithmetic units 370 and multiple load/store units 360 to allow multiple thread groups to be executed simultaneously in the processing device 31 while some instructions may need multiple cycles to be executed. The arithmetic unit 370 may execute instructions related to arithmetic operations. The arithmetic unit 370 may include integer and floating point arithmetic logic unit (ALU). In one embodiment, the arithmetic unit 370 may also include special function units, such as circuits specifically designed for multiplication, division, exponential function, or trigonometric function.

The load/store unit 360 may execute instructions related to accessing the data memory unit 40, such as LD and ST. The load/store unit 360 may also be called a data access unit. The load/store unit 360 is responsible for loading data from the data memory unit 40 to the register, and storing the register data to the data memory unit 40. The data memory unit 40 may be a memory circuit. The data memory unit 40 may include a number of hierarchical memory structures. For example, the data memory unit 40 may include an on-chip memory that is disposed on the same chip as the processing device 31, and an off-chip memory that is disposed on a different chip. Cache may also be utilized in the data memory unit 40 to enhance access speed.

Take the LD instruction for example, when the multiple processing elements of the load/store unit 360 execute the LD instruction simultaneously, each processing element reads data from the data memory unit 40 in the same time, thus requiring a large memory bandwidth. For the processing device 31, when there is a large memory bandwidth loading, the LD instruction executed by the multiple processing elements of the load/store unit 360 may not be able to complete in one clock cycle, therefore introducing extra waiting time. As can be seen, the program execution time may be increased enormously due to lack in an efficient scheduling method for multiple thread groups.

The processing device 31 according to one embodiment of this disclosure includes a MAF unit 380, which is configured to monitor the state of the load/store unit 360 to know whether or not the load/store unit 360 is available. For example, after the load/store unit 360 finishes the data access operation to/from the data memory unit 40, the load/store unit 360 may issue a control signal to inform the MAF unit 380 that it is available now. The load/store unit 360 being available may refer to the load/store unit 360 being in an idle state. The MAF unit 380 may obtain the usage state of the load/store unit 360 by continually monitoring the control signal.

The MAF unit 380 not only monitors whether the load/store unit 360 is available, but also determines whether or not at least one data access thread group $W_{DA}$ exists according to the scoreboard T when the load/store unit 360 is available. The data access thread group $W_{DA}$ may include one or more thread group $W_i$. The thread group $W_i$ in the scoreboard T satisfying the following conditions belongs to the data access thread group $W_{DA}$: the ready state $RD_i$ is affirmative, and the next instruction $INS_i$ is related to accessing the data memory unit 40 (such as LD instruction or ST instruction). If there is no such thread group satisfying these two conditions (the ready state $RD_i$ is affirmative, and the next instruction $INS_i$ is related to accessing the data memory unit 40), the data access thread group $W_{DA}$ does not exist.

The warp scheduler 340 may determine the scheduling order for the thread groups $W_0$-$W_M$ according to the scoreboard T. The warp scheduler 340 may also be called an arbitration unit. In order to achieve good resource utilization rate and overcome the performance bottleneck caused by the memory bandwidth, when the MAF unit 380 finds out that the load/store unit 360 is available, the MAF unit 380 may send an indication signal related to the data access thread group $W_{DA}$ to the warp scheduler 340, such that the warp scheduler 340 may determine the target thread group $W_T$ according to the data access thread group $W_{DA}$. Specifically, when the data access thread group $W_{DA}$ exists, the warp scheduler 340 may select the target thread group $W_T$ from the data access thread group $W_{DA}$ prior to from other thread groups, such that a task may be dispatched to the load/store unit 360 immediately when the load/store unit 360 is available.

The dispatch unit 330 may be controlled by the warp scheduler 340 to dispatch the target thread group $W_T$ to the load/store unit 360 or the arithmetic unit 370 in the functional unit 350 for execution. In one embodiment, the warp control unit 310, the instruction fetch unit 320, the dispatch unit 330, the warp scheduler 340, the MAF unit 380, the load/store unit 360, and the arithmetic unit 370 may be implemented by hardware circuits and may be implemented by an integrated circuit on a chip.

Figure 4:
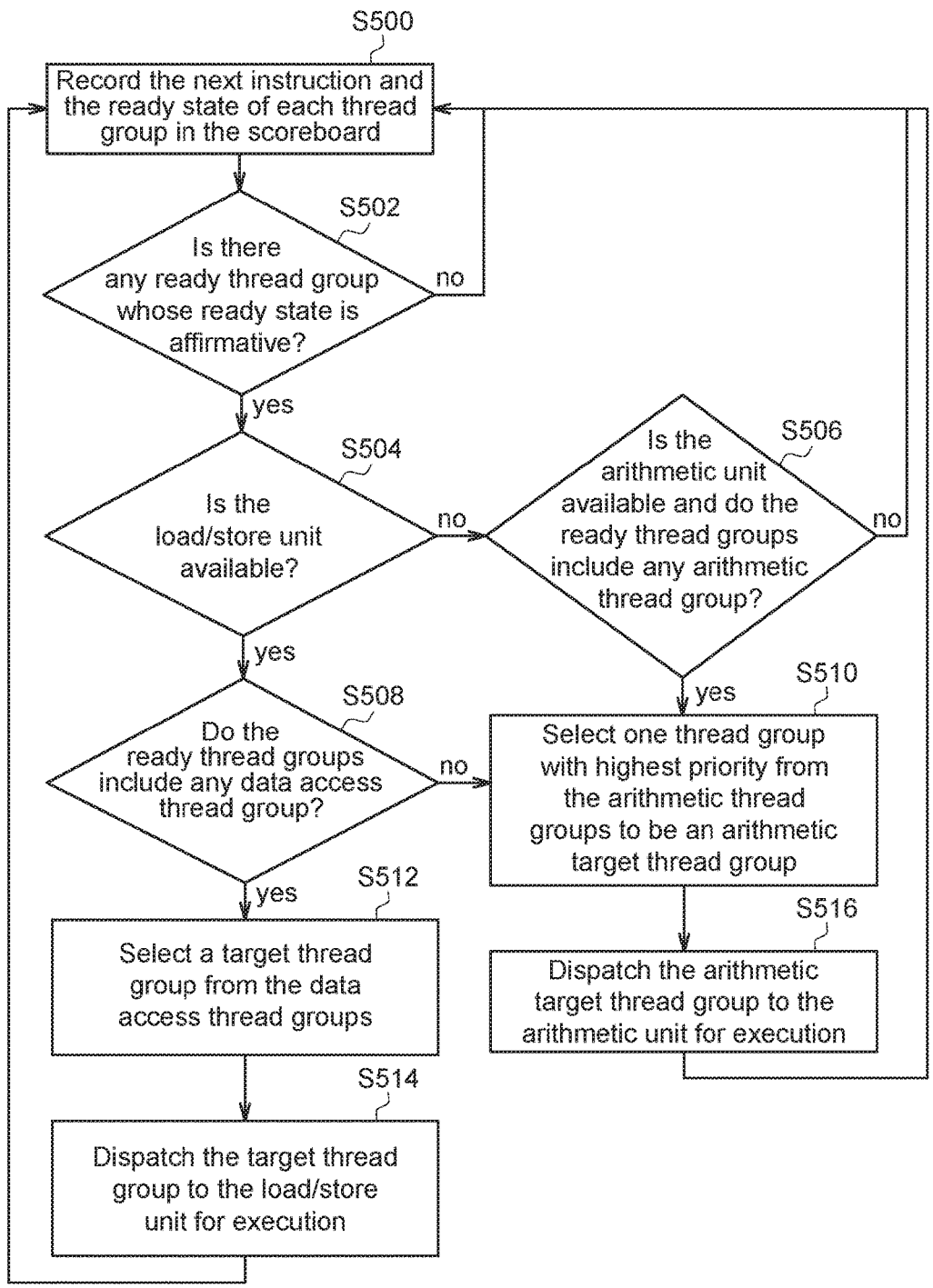
FIG. 4 shows a flowchart illustrating a scheduling method according to an embodiment of this disclosure.

The scheduling method of the processing device 31 in the above embodiment may be referred to in FIG. 4, which shows a flowchart illustrating a scheduling method according to an embodiment of this disclosure. The scheduling method includes the following steps. Step S500: record the next instruction $INS_i$ and the ready state $RD_i$ of each thread group $W_i$ in the scoreboard T. The scoreboard T may be stored in a memory circuit. The step S500 may include recording when initially receiving the thread groups $W_i$ and continually updating the scoreboard T afterwards. For example, when an instruction has been fetched and decoded, the fetched instruction may be written to the next instruction $INS_i$ field in the scoreboard T and the ready state $RD_i$ may be updated accordingly. Referring to the processing device 31 shown in FIG. 3, the scoreboard T may be stored in the warp control unit 310. As for the updating procedure in the step S500, the scoreboard T may be maintained by the warp control unit 310 according to at least one of the operating results of the instruction fetch unit 320, the dispatch unit 330, the warp scheduler 340, and the functional unit 350 in each clock cycle.

Step 502: determine whether or not there is any ready thread group whose ready state is affirmative. The determination in the step S502 may be dependent on the scoreboard T. If there is no ready thread group, it represents that there is no suitable thread group for scheduling in the current clock cycle, and then the method goes back to the step S500 to repeat the step in the next clock cycle. If the determination result of the step S502 is yes, further determination has to be made regarding which thread group is going to be scheduled first.

Step S504: determine whether or not the load/store unit 360 is available. The load/store unit 360 is configured to access the data memory unit 40. Referring to the processing device 31 shown in FIG. 3, the step S504 may be performed by the MAF unit 380. If the determination result of the step S504 is yes, it represents that the load/store unit 360 is available. If there is a data access thread group $W_{DA}$ that can be executed by the load/store unit 360, such data access thread group $W_{DA}$ may be scheduled first.

Step S508: determine whether or not at least one data access thread group $W_{DA}$ exists in the ready thread group. The next instruction of the data access thread group $W_{DA}$ is related to accessing the data memory unit 40. The data access thread group $W_{DA}$ may include one or more thread groups. If the determination result of the step S508 is yes, there is a thread group $W_i$ in the scoreboard T satisfying the following conditions: the ready state $RD_i$ is affirmative, and the next instruction $INS_i$ is related to accessing the data memory unit 40. The thread group $W_i$ satisfying these two conditions may be scheduled first. The step S508 may be performed by the MAF unit 380.

Step S512: select a target thread group $W_T$ from the data access thread group $W_{DA}$. The step S512 may be performed only by the warp scheduler 340 or be performed by the warp scheduler 340 with the MAF unit 380. Step S514: dispatch the target thread group $W_T$ to the load/store unit 360 for execution. The step S514 may be performed by the dispatch unit 330.

The scheduling method and the processing device using the same in the above embodiments consider the usage state of the load/store unit, particularly based on whether or not the load/store unit is available and the state and instructions of the thread groups in the scoreboard, to schedule multiple thread groups. As such, the utilization rate of the load/store unit can be increased, hence decreasing the idle time of the load/store unit. In parallel computing program architecture, because the data amount to be processed may be large, the memory bandwidth may easily become the bottleneck of the program execution time. By utilizing the scheduling method and the processing device disclosed herein, the utilization rate of the load/store unit can be increased, thus reducing the impact of the memory bandwidth on the execution performance, and reducing the program execution time.

In one embodiment, the scheduling method may further include calculating priority $P_i$ for each thread group $W_i$. The priority $P_i$ is related to a default scheduling order of each thread group $W_i$. For example, the priority $P_i$ may be related to the time order that each thread group $W_i$ is received, the current waiting time of each thread group $W_i$, and the remaining instruction count of each thread group $W_i$. Referring to the processing device in FIG. 3, the warp scheduler 340 may dynamically calculate the priority $P_i$ of each thread group $W_i$ according to the state of each thread group $W_i$ such that the warp scheduler 340 can select the target thread group $W_T$ according to the priority $P_i$.

As described above, the data access thread group $W_{DA}$ may include multiple thread groups. The step S512 may further include: selecting one thread group with highest priority from the data access thread group $W_{DA}$ to be the target thread group $W_T$. The step of selecting one thread group with highest priority may be performed by the warp scheduler 340 or the MAF unit 380.

Other steps shown in FIG. 4 are explained below. When the determination result of the step S504 is no, it represents that the load/store unit 360 is currently busy. In this case, instructions that access the data memory unit 40 are not processed first. Instead, arithmetic instructions are to be scheduled. Step S506 is then executed: determine whether or not the arithmetic unit 370 is available, and determine whether or not at least one arithmetic thread group $W_{AR}$ exists in the ready thread group. The next instruction of the arithmetic thread group $W_{AR}$ is related to performing arithmetic operation by the arithmetic unit 370. The step S506 may be performed by the warp scheduler 340.

Note that the classification of the data access thread group $W_{DA}$ and the arithmetic thread group $W_{AR}$ in this disclosure depends on the next instruction of the thread group at the current moment. In other words, the same thread group may be classified into different categories at different time because of the different next instructions at different time. Furthermore, for a data access thread group $W_{DA}$, the next instruction at the current moment is related to accessing the data memory unit 40. However, the other instructions included in the data access thread group $W_{DA}$ may be related to performing arithmetic operation by the arithmetic unit 370.

If the determination result of the step S506 is no, there is no thread group suitable for being scheduled. The method then goes back to step S500. If the determination result of the step S506 is yes (the arithmetic unit 370 is available and the arithmetic thread group $W_{AR}$ exists), step S510 is executed: select one thread group with highest priority $P_i$ from the arithmetic thread group $W_{AR}$ to be an arithmetic target thread group $W_{T4}$. The step S510 may be performed by the warp scheduler 340. Next the step S516 is executed: dispatch the arithmetic target thread group $W_{T4}$ to the arithmetic unit 370 for execution. The step S516 may be performed by the dispatch unit 330. Because the step S510 and the step S516 schedule thread groups related to arithmetic operations, the MAF unit 380 need not be used here, and the arithmetic target thread group $W_{T4}$ may be determined according to the priority $P_i$.

Figures 5, 6A:
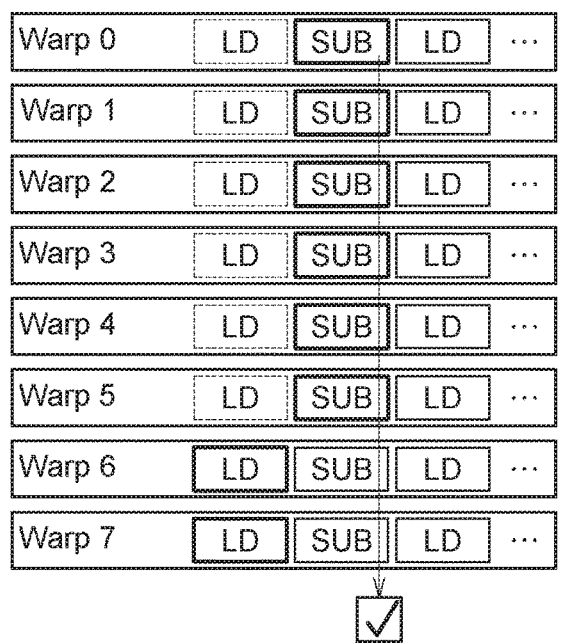
FIG. 5 shows an exemplary scoreboard for storing thread groups according toe an embodiment of this disclosure.
FIGS. 6A-6C show an example of scheduling multiple thread groups according to an embodiment of this disclosure.

To clearly illustrate the scoreboard T, FIG. 5 shows an exemplary scoreboard for storing thread groups according toe an embodiment of this disclosure. The fields in the exemplary scoreboard T include: ID, Valid, PC, INS, Ready, and other Flags. ID represents the index number in this scoreboard T. One index number corresponds to one thread group $W_i$. Valid represents whether or not this row in the scoreboard T is valid. For example, when it is in the initial state or when there is no task, the scoreboard T is empty. The Valid field may be set to N to represent the current content is invalid. When a thread group is scheduled normally, the content is valid and hence the corresponding Valid field is Y. When a thread group has been executed completely, the finished thread group is no longer stored in the scoreboard T, and hence the corresponding Valid field may be set to N to indicate that new thread groups may be added to this row in the scoreboard T. PC represents the current program counter value of this thread group. INS represents the next instruction of this thread group, which may be an arithmetic instruction or a data access instruction. For example, the instruction fetch unit 320 may fetch an instruction from the instruction memory unit 42 according to the PC field. The fetched instruction may be stored in the INS field after being decoded. Ready represents the ready state of this thread group. Y in the Ready field represents that the ready state is affirmative. The Flags field may include several control flags of this thread group, such as branch instruction, memory barrier instruction, and so on.

Depending on the circuit implementation, the warp control unit 310 may be selectively coupled to other units in the processing device 31. The scoreboard T may be stored in the warp control unit 310, and may be maintained by the warp control unit 310 according to at least one of the operating results of the instruction fetch unit 320, the dispatch unit 330, the warp scheduler 340 and the functional unit 350. For example, when the instruction fetch unit 320 has fetched an instruction, the scoreboard T may be updated accordingly. After the warp scheduler 340 determines the target thread group $W_T$, the warp control unit 310 may update the ready state $RD_T$ and the program counter $PC_T$ of the target thread group $W_T$. The scoreboard T may be updated in every clock cycle of the processing device 31, such as being updated according to which instruction has been executed in the current clock cycle.

The warp control unit 310 may update the ready state $RD_T$ of the target thread group $W_T$ after the dispatch unit 330 dispatches the target thread group $W_T$ to the functional unit 350. The warp control unit 310 may also update the scoreboard T according to the execution state of the functional unit 350 including the arithmetic unit 370 and the load/store unit 360, such as whether or not the instruction has been executed completely.

Referring to the flowchart shown in FIG. 4 and the scoreboard shown in FIG. 5, when performing the step S502, check whether or not there is any ready thread group. According to the example in FIG. 5, thread groups with Y in the Ready field are identified, including thread groups with ID 0, 1, 3, 5. Assume that the load/store unit 360 is available in the current clock cycle, that is, the determination result of the step S504 is yes, the data access thread groups $W_{DA}$ identified in the step S508 include thread groups with ID 0 and 5 (the INS of the thread group $W_M$ is ST, but its Ready field is N, and thus is not a ready thread group). The step S512 selects one thread group with highest priority from these two thread groups ($W_0$ and $W_5$) to be the target thread group $W_T$. The scheduling result can utilize the load/store unit 360 that is currently available.

The scheduling method shown in FIG. 4 may not only be applied to the hardware circuit shown in FIG. 3, but also may be implemented by software. For example, a program corresponding to the scheduling method in FIG. 4 may be stored in a non-transitory computer readable medium. The program may be loaded by a computer processor to execute the steps shown in FIG. 4. The scoreboard T may be maintained by the computer processor.

According to the scheduling method and the processing device in this disclosure, only one addition module (the MAF unit) is required. Thus the proposed scheduling method is compatible with any existing scheduling method. The proposed scheduling method can be accomplished by adding an extra MAF unit. The software or hardware configuration of the original scheduling method does not have to be modified. For example, for an existing processing device that uses a particular algorithm for determining priority for each thread group, an extra MAF unit according to one embodiment of this disclosure may be added to the existing processing device to apply the proposed scheduling method. The added MAF unit is capable of monitoring the usage state of the load/store unit. As the flowchart shown in FIG. 4, the original priority calculation algorithm is not affected and can still be applied. The extra MAF unit provides additional information for determining the target thread group to be scheduled to increase the program execution performance. Because of the high compatibility, the proposed scheduling method and the processing device can be integrated easily and have a variety of applications. An example is given below to show different scheduling results regarding whether the usage state of the load/store unit is considered.

Figure 6B:
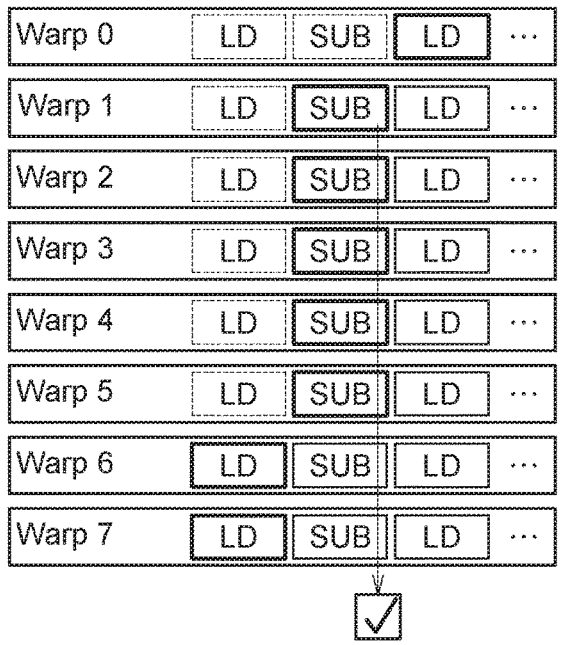
Figure 6C:
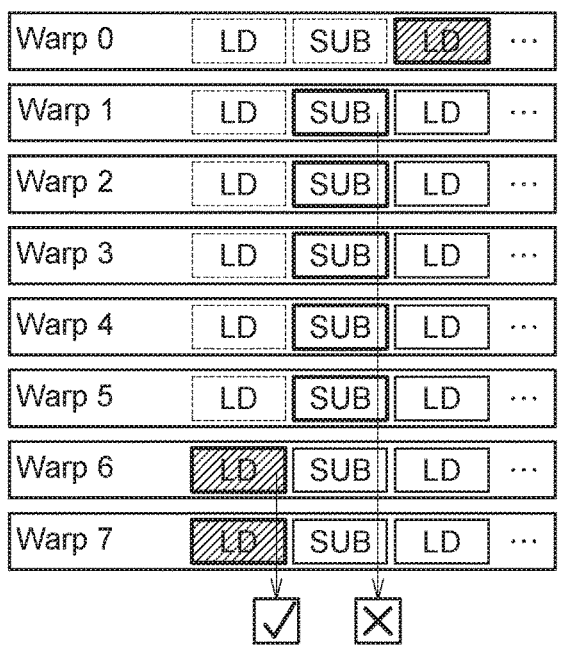

FIGS. 6A-6C show an example of scheduling multiple thread groups according to an embodiment of this disclosure. In this example, the priority of the thread groups is determined in a similar fashion to the round-robin scheduling method. The boxes in dashed lines shown in FIG. 6A represent the instructions that have been executed completely or have been dispatched to the load/store unit or the arithmetic unit. The boxes in thick solid lines are the next instructions. The next instruction for the warp 6 and warp 7 is LD. The next instruction for the warps 0-5 is SUB. Assume each warp is in the ready state. According to the round-robin method, the method attempts to schedule warp 6. The next instruction is LD, but the load/store unit 360 is currently busy and not able to execute the LD instruction. Therefore warp 6 is skipped. The method then attempts to schedule warp 7. Because the load/store unit 360 is still busy and not able to execute the LD instruction, warp 7 is skipped as well to proceed to the next target warp 0. Because the arithmetic unit 370 is currently available, the SUB instruction of warp 0 can be dispatched to the arithmetic unit 370 for execution. Assume the load/store unit 360 becomes available (for example, the previous task executed by the load/store unit 360 has been completed) after finishing the SUB instruction of warp 0, FIG. 6B and FIG. 6C illustrate two different situations regarding whether the MAF unit 380 is used.

FIG. 6B shows that the usage state of the load/store unit 360 is not considered in priority. According to the original round-robin method, the next scheduling attempt is warp 1. Because the arithmetic unit 370 is available now, warp 1 is selected as the target thread group. The SUB instruction of warp 1 is dispatched to the arithmetic unit 370 for execution.

In contrast, FIG. 6C shows that the usage state of the load/store unit 360 is considered in priority. When the round-robin method attempts to schedule warp 1, the MAF unit 380 finds out that the load/store unit 360 is available now. According to the step S504 and S508, the MAF unit 380 identifies the data access thread groups $W_{DA}$, including warps 0, 6, 7 in this example (shown in shaded boxes with the corresponding next instruction LD). According to the step S512, the warp scheduler 340 or the MAF 380 itself may select one thread group with highest priority among the data access thread groups $W_{DA}$. For example, $P_6 > P_7 > P_0$ ($P_i$ represents the priority of warp i), warp 6 is selected as the target thread group, as compared to the example shown in FIG. 6B where warp 1 is scheduled first.

Because the MAF unit 380 continually monitors the load/store unit 360, when the load/store unit 360 is available and there is appropriate data access thread group $W_{DA}$ that can be executed by the load/store unit 360, the corresponding data access thread group $W_{DA}$ can be immediately dispatched to the load/store unit 360 for execution. In such way the idle time of the load/store unit 360 can be reduced. As the example shown in FIG. 6B, after scheduling warp 1, warps 1-5 having the SUB instructions are going to be scheduled next, and then the LD instruction of warp 6 is scheduled. During the time when warps 1-5 are executed, the load/store unit 360 in the idle state is not utilized efficiently. Such excess idle time of the load/store unit 360 may result in longer program execution time.

According to the scheduling method and the processing device using the same, an MAF unit is added. By monitoring the load/store unit and the state of each thread group in the scoreboard, the scheduling order can be adjusted when the load/store unit is available. The proposed scheduling method is not only easy for being integrated to existing scheduling methods for preserving the advantages of the original scheduling methods, but also capable of reducing the idle rate of the load/store unit and improving the performance of a GPU.

It is intended that the specification and examples be considered as exemplary only, with a true scope of the disclosure being indicated by the following claims and their equivalents.

What is claimed is:

1. A scheduling method for scheduling thread groups, comprising:
   recording a next instruction and a ready state of each thread group in a scoreboard, wherein the ready state indicates whether the corresponding thread group is ready or not;
   determining whether or not there is at least one ready thread group, wherein the ready state of the at least one ready group indicates the at least one ready thread group is ready;
   determining whether or not a load/store unit is available and whether or not an arithmetic unit is available, wherein the load/store unit is configured to access a data memory unit; and
   selecting a target thread group from at least one data access thread group which exists in the at least one ready thread group and dispatching the target thread group to the load/store unit for execution when the load/store unit is available and even when the arithmetic unit is not available, wherein the next instruction of the at least one data access thread group is related to accessing the data memory unit.

2. The scheduling method according to claim 1, further comprising:
   calculating priority for each thread group, wherein the priority is related to a default scheduling order of each thread group.

3. The scheduling method according to claim 2, wherein the selecting the target thread group from the at least one data access thread group further comprises:
   selecting one thread group with highest priority from the at least one data access thread group to be the target thread group.

4. The scheduling method according to claim 2, further comprising:
   when the load/store unit is busy, determining whether or not the arithmetic unit is available, and determining whether or not at least one arithmetic thread group exists in the at least one ready thread group, wherein the next instruction of the at least one arithmetic thread group is related to performing arithmetic operation by the arithmetic unit.

5. The scheduling method according to claim 4, further comprising:
   when the arithmetic unit is available and the at least one arithmetic thread group exists, selecting one thread group with highest priority from the at least one arithmetic thread group to be an arithmetic target thread group; and
   dispatching the arithmetic target thread group to the arithmetic unit for execution.

6. The scheduling method according to claim 1, wherein the ready state is related to whether or not the next instruction has been decoded and whether or not operands corresponding to the next instruction have been available.

7. A processing device for scheduling thread groups, the processing device comprising:
   a warp control unit, configured to maintain a scoreboard, the scoreboard recording an execution state of each thread group, the execution state of each thread group comprising a next instruction and a ready state of each thread group, wherein the ready state indicates whether the corresponding thread group is ready or not;
   an instruction fetch unit, configured to fetch the next instruction of each thread group from an instruction memory unit and update to the scoreboard;
   a functional unit, comprising:
      an arithmetic unit; and
      a load/store unit, configured to access a data memory unit;
   a memory access first (MAF) unit, configured to monitor whether or not the load/store unit is available and whether or not the arithmetic unit is available, and determine whether or not at least one data access thread group exists when the load/store unit is available, wherein the ready state of the at least one data access thread group indicates the at least one data access thread group is ready, and the next instruction of the at least one data access thread group is related to accessing the data memory unit;
   a warp scheduler, configured to select a target thread group from the at least one data access thread group when the load/store unit is available and even when the arithmetic unit is not available; and
   a dispatch unit, configured to dispatch the target thread group to the load/store unit for execution when the load/store unit is available and even when the arithmetic unit is not available.

8. The processing device according to claim 7, wherein the warp scheduler is further configured to calculate priority for each thread group, and the priority is related to a default scheduling order of each thread group.

9. The processing device according to claim 8, wherein when the load/store unit is available and the at least one data access thread group exists, the warp scheduler selects one thread group with highest priority from the at least one data access thread group to be the target thread group.

10. The processing device according to claim 8, wherein when the load/store unit is busy or the at least one data access thread group does not exist, the warp scheduler selects one thread group with highest priority from at least one arithmetic thread group to be the target thread group, the ready state of the at least one arithmetic thread group is affirmative, and the next instruction of the at least one arithmetic thread group is related to performing arithmetic operation by the arithmetic unit.

11. The processing device according to claim 7, wherein the ready state is related to whether or not the next instruction has been decoded and whether or not operands corresponding to the next instruction have been available.

12. The processing device according to claim 7, wherein after the warp scheduler determines the target thread group, the warp control unit updates the ready state of the target thread group in the scoreboard.

13. The processing device according to claim 7, wherein the warp control unit maintains the scoreboard according to at least one of operating results of the instruction fetch unit, the warp scheduler, the dispatch unit, and the functional unit.

14. A non-transitory computer readable medium with instructions stored thereon for scheduling thread groups, that when executed on a computer processor, perform the steps comprising:
recording a next instruction and a ready state of each thread group in a scoreboard wherein the ready state indicates whether the corresponding thread group is ready or not;
determining whether or not there is at least one ready thread group, wherein the ready state of the at least one ready group indicates the at least one ready thread group is ready;
determining whether or not a load/store unit is available and whether or not an arithmetic unit is available, wherein the load/store unit is configured to access a data memory unit; and
selecting a target thread group from at least one data access thread group which exists in the at least one ready thread group and dispatching the target thread group to the load/store unit for execution when the load/store unit is available and even when the arithmetic unit is not available, wherein the next instruction of the at least one data access thread group is related to accessing the data memory unit.

15. The non-transitory computer readable medium according to claim 14, further comprising:
calculating priority for each thread group, wherein the priority is related to a default scheduling order of each thread group.

16. The non-transitory computer readable medium according to claim 15, wherein the selecting the target thread group from the at least one data access thread group further comprises:
selecting one thread group with highest priority from the at least one data access thread group to be the target thread group.

17. The non-transitory computer readable medium according to claim 15, further comprising:
when the load/store unit is busy, determining whether or not the arithmetic unit is available, and determining whether or not at least one arithmetic thread group exists in the at least one ready thread group, wherein the next instruction of the at least one arithmetic thread group is related to performing arithmetic operation by the arithmetic unit.

18. The non-transitory computer readable medium according to claim 17, further comprising:
when the arithmetic unit is available and the at least one arithmetic thread group exists, selecting one thread group with highest priority from the at least one arithmetic thread group to be an arithmetic target thread group; and
dispatching the arithmetic target thread group to the arithmetic unit for execution.

19. The non-transitory computer readable medium according to claim 14, wherein the ready state is related to whether or not the next instruction has been decoded and whether or not operands corresponding to the next instruction have been available.

20. The non-transitory computer readable medium according to claim 14, wherein the scoreboard is maintained by the computer processor.

* * * * *